United States Patent [19]
Bingham et al.

[11] Patent Number: 4,759,911
[45] Date of Patent: Jul. 26, 1988

[54] GAS COOLED NUCLEAR FUEL ELEMENT

[75] Inventors: Billy E. Bingham; Richard V. Demars, both of Lynchburg; William G. Pettus, Monroe, all of Va.

[73] Assignee: The Babcock & Wilcox Company, New Orleans, La.

[21] Appl. No.: 42,993

[22] Filed: Apr. 27, 1987

[51] Int. Cl.$^4$ ............................................. G21C 3/30
[52] U.S. Cl. ................................. 376/428; 376/427; 376/455; 264/0.5
[58] Field of Search .................. 376/427, 428, 455; 264/2.5

[56] References Cited

U.S. PATENT DOCUMENTS

| | | | |
|---|---|---|---|
| 2,985,576 | 5/1961 | Hollings | 376/455 |
| 3,074,873 | 1/1963 | Kling | 376/455 |
| 3,291,696 | 12/1966 | Sugimoto | 376/428 |
| 3,926,720 | 12/1975 | Hosegood | 376/428 |
| 4,022,663 | 5/1977 | Hrovat | 376/428 |
| 4,678,629 | 7/1987 | Popa | 376/428 |

Primary Examiner—Donald P. Walsh
Attorney, Agent, or Firm—Robert J. Edwards; D. Neil LaHaye

[57] ABSTRACT

A gas cooled nuclear fuel element. A plurality of progressively sized rigid porous cylinders nested together in coaxial alignment are provided with varying quantities of nuclear fuel to enhance the power density while remaining within temperature limitations of the fuel and base material.

15 Claims, 1 Drawing Sheet

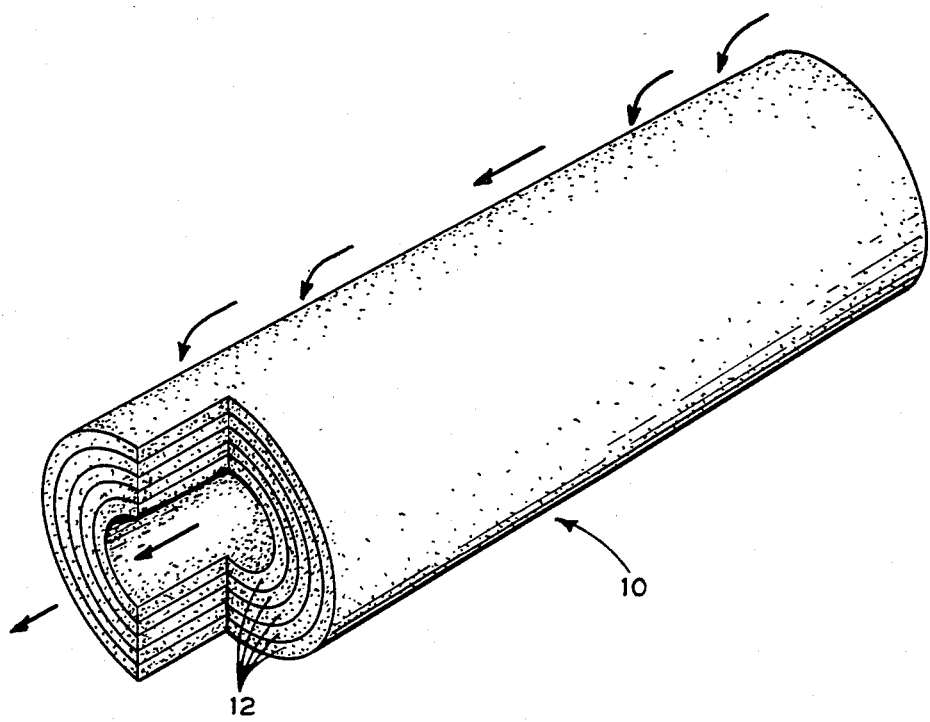

GAS COOLED NUCLEAR FUEL ELEMENT

BACKGROUND OF THE INVENTION

1. Field of the Invention

The present invention is related to nuclear fuel elements and in particular to gas cooled nuclear fuel elements.

2. General Background

Gas-cooled particle bed reactors (PBR's) being considered for multi megawatt space power and propulsion applications in strategic defense initiative studies are cooled by a gas flowing radially inward through the annular particle bed. These reactors use fuel elements formed from particle fuel wherein the fuel particle bed is confined in the annular space between an outer porous cylinder and an inner porous cylinder. The coolant gas flows out of an axial channel defined by the inner porous cylinder. A variety of fuel elements and fuel particles are known in the art.

U.S. Pat. No. 3,992,258 entitled "Coated Nuclear Fuel Particles And Process For Making The Same" discloses coated nuclear fuel particles of low density to accommodate fission gases generated during the use of the fuel particles.

U.S. Pat. No. 3,928,132 entitled "Annular Fuel Element For High-Temperature Reactors" discloses a compacted fuel element of annular shape enclosed in a graphite casing constituted by an inner and outer tube. The outer tube is larger than the inner tube and also has a greater coefficient of shrinkage.

U.S. Pat. No. 3,361,638 entitled "Pyrolytic Graphite And Nuclear Fuel Particles Coated Therewith" disclosed a nuclear fuel particle having a central core of fissile or fertile material surrounded by a fission-product retentive layer of true pyrolytic graphite.

U.S. Pat. No. 3,311,540 entitled "Integral Boiling and Superheating Nuclear Reactor And Pressure Tube Assembly Therefor" discloses a direct cycle integral vapor generating and superheating reactor having, within each pressure tube, a plurality of concentric annular fuel elements clad in metal such as stainless steel. The coolant passes alternately downwardly and upwardly among the fuel elements from the outer flow passage to the inner flow passage.

U.S. Pat. No. 3,222,773 entitled "Process For Assembling Concentrically Spaced Nuclear Fuel Elements" discloses a process of assembly for arranging cladded tubular and cylindrical nuclear fuel members within each other.

U.S. Pat. No. 3,345,733 entitled "Nuclear Reactor Fuel Elements" discloses a method of constructing a nuclear fuel element of a plurality of part annular plates supported at their longitudinal edges by radial support members to define a series of spaced coaxial tubes.

U.S. Pat. No. 2,985,576 entitled "Fuel Element For Nuclear Reactor", U.S. Pat. No. 3,138,534 entitled "Fuel Arrangement For A Neutronic Test Reactor", U.S. Pat. No. 3,165,448 entitled "Nuclear Reactor Core And Fuel Assembly", U.S. Pat. No. 3,422,523 entitled "Process For Fabricating Nuclear Reactor Fuel Elements", and U.S. Pat. No. 3,753,854 entitled "Production Of A Fuel Carbide With A Jacket Of Fuel Nitride, Sulfide, or Phosphide" are representative of the art.

Calculations indicate that for uniformly loaded fuel elements the full potential power density of the peripheral fuel cannot be realized because of heat transfer and fuel temperature constraints in the hot region at the inner boundary of the fuel element.

SUMMARY OF THE INVENTION

The present invention solves the above problems in a straightforward manner. What is provided is a fuel element formed from a plurality of nested rigid porous cylinders in coaxial alignment and suitably sized to allow placement of each cylinder within the cylinder of the next largest size. Varying quantities of fissionable isotopes are distributed on each cylinder to achieve greater optimal power density than that achieved in current particle bed reactors.

In view of the above, it is an object of the invention to provide a nuclear fuel element that facilitates zone loading of the nuclear fuel isotopes to enhance power density.

It is another object of the invention to provide a nuclear fuel element that accommodates longitudinal thermal expansion.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 1 is a partial cutaway view of the invention.

DETAILED DESCRIPTION OF THE PREFERRED EMBODIMENT

Referring to the drawing, it is seen that the invention is generally referred to by the numeral 10. Nuclear fuel element 10 is comprised of a plurality of nested rigid porous cylinders 12. Cylinders 12 are suitably sized in progressively decreasing circumference to allow positioning of each of the cylinders 12 within the cylinder of the next largest size. This results in a single fuel element wherein all of the cylinders 12 are in coaxial alignment.

Cylinders 12 may be formed by methods known in the art such as foaming a material to form open lattices, wrapping fuel fibers, or weaving a base material. In the preferred embodiment, the pore size is in the range of from 0.5 to 5.0 millimeters. The pore size can also be varied from one cylinder to the next such as having smaller pores at the outside cylinder. This helps to achieve an optimal balance between full density, heat transfer surface area, gas velocity, and pressure drop for particular applications. The nuclear fuel distributed on each cylinder 12 may be any of the known fuels in the art such as uranium or plutonium oxides or nitrides, uranium dicarbide ($UC_2$), uranium carbide (UC), plutonium carbide (PuC), or americium carbide (AmC). Application of the nuclear fuel to cylinders 12 may be accomplished by coating or impregnating the cylinder base material with the desired fuel. An open pore foam material which can serve as the skeleton on which the fissile material may be deposited is reticulated vitreous carbon (RVC). RVC has an exceptionally high void volume (97%), high surface area combined with self-supporting rigidity, low resistance to fluid flow, resistance to very high temperatures in non-oxidizing environments, and is available in a wide range of porosity grades. Protective coatings such as carbon or zirconium carbide for the nuclear fuel may be accomplished by means known in the art such as vapor deposition coating after the fuel has been distributed on each of cylinders 12.

In the preferred embodiment, the power density of fuel element 10 is enhanced by providing varying quanities of nuclear fuel from the larger or outermost to the smaller or innermost of cylinders 12. Although the total amount of fuel in each of cylinders 12 differs from that of adjacent cylinders, the fuel is evenly distributed on each cylinder. With this fuel distribution, each cylinder is allowed to operate at its maximum power level within the heat transfer constraints existing at its radial location. The process for preparing the fuel element is as follows. First, select a reticulated vitreous carbon skeleton of appropriate pore and ligament size. Second, deposit the selected fissile material on the skeleton by vapor deposition coating. Third, subject the coated skeleton to high temperature to cause the fissile material to change to its carbide form. Fourth, deposit a protective carbon barrier layer by chemical vapor deposition. Fifth, deposit a final protective layer of zirconium carbide by chemical vapor deposition. Control of the axial and azimuthal flow distribution can be achieved by appropriately varying the coating thickness of the protective layers at the inlet side of the outermost cylinder to restrict the flow passages where lower flow is desired.

In operation, coolant gas flows radially through and then axially out of fuel element 10 as indicated by the arrows in the drawing. Movement of the coolant gas through fuel element 10 transfers heat generated by the nuclear fuel to the gas. The heated gas is then directed to a suitable energy conversion system and subsequently vented to space or else the gas is cooled and the process is repeated on a continual basis. Alternately, the heated gas may be directed through a nozzle for rocket propulsion applications.

As an alternate embodiment, the protective coatings described above may be deleted. Also, the fuel element may be formed directly from uranium metal foam by the process described in U.S. Pat. No. 4,560,621, then reacted with carbon to form uranium carbide, and then coated with protective layers as described above.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

These differing embodiments may include radial coolant flow in the outward direction and may include longitudinal flow through transverse layers or flat disk-like foam fuel members of varying fissile material content to achieve the optimal power distribution.

The differing embodiment may also include annular configurations with internal neutron moderators.

The differing embodiments may also include tapered or conical fuel cylinders with the outlet end flared outward to accommodate higher exit gas velocities.

What is claimed as invention is:

1. A gas cooled nuclear fuel element, comprising a plurality of rigid porous cylinders suitably sized for coaxial positioning of each of the smaller of said cylinders within the next largest cylinder, wherein said cylinders are provided with varying quantities of fissionable nuclear fuel to maximize the total power production within the element.

2. The fuel element of claim 1, wherein said fuel element is designed for radial gas flowthrough and axial gas outflow.

3. The fuel element of claim 1, wherein said fuel element is provided with the nuclear fuel uranium carbide.

4. The fuel element of claim 1, wherein said fuel element is provided with the nuclear fuel plutonium carbide.

5. The fuel element of claim 1, wherein said fuel element is provided with the nuclear fuel americium carbide.

6. The fuel element of claim 1, wherein said fuel element is provided with the nuclear fuel uranium dicarbide.

7. The fuel element of claim 1, wherein said porous cylinders have pores in the range of 0.5 to 5.0 millimeters.

8. The fuel element of claim 1, wherein said porous cylinders are formed from reticulated vitreous carbon.

9. The fuel element of claim 1, further comprising a protective layer of carbon on said cylinders.

10. The fuel element of claim 1, further comprising a protective layer of zirconium carbide on said cylinders.

11. A process for preparing a gas cooled nuclear fuel element, comprising:
  a. selecting a reticulated vitreous carbon skeleton of appropriate pore and ligament size;
  b. depositing a fissile material on said skeleton; and
  c. subjecting said coated skeleton to high temperature whereby said fissile material is changed to its carbide form.

12. The process of claim 11, further comprising depositing a protective layer of carbon on said coated skeleton.

13. The process of claim 12, further comprising depositing a protective layer of zirconium carbide over said carbon layer.

14. The process of claim 11, wherein said depositing of fissile material is accomplished by vapor deposition coating.

15. The process of claim 11, wherein the pore size of said skeleton ranges from 0.5 to 5.0 millimeters.

* * * * *